(12) United States Patent
Grzegorzewska et al.

(10) Patent No.: US 7,094,091 B2
(45) Date of Patent: Aug. 22, 2006

(54) SWIVEL ADAPTER

(75) Inventors: Barbara Grzegorzewska, Chicago, IL (US); Ilya Makhlin, Wheeling, IL (US); Thomas R. Marrapode, Naperville, IL (US); Mark Matuszewski, Elmhurst, IL (US); David S. Rifkin, Aurora, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/973,476

(22) Filed: Oct. 26, 2004

(65) Prior Publication Data

US 2005/0112939 A1    May 26, 2005

Related U.S. Application Data

(60) Provisional application No. 60/514,773, filed on Oct. 27, 2003.

(51) Int. Cl.
 *H01R 13/60* (2006.01)

(52) U.S. Cl. ............................................. 439/354
(58) Field of Classification Search ............... 439/534
 See application file for complete search history.

(56) References Cited

U.S. PATENT DOCUMENTS

| | | | | |
|---|---|---|---|---|
| 5,639,261 | A * | 6/1997 | Rutkowski et al. | 439/534 |
| 6,277,902 | B1 * | 8/2001 | Scholl | 523/213 |
| 6,537,106 | B1 * | 3/2003 | Follingstad | 439/534 |
| 6,550,977 | B1 * | 4/2003 | Hizuka | 385/55 |

* cited by examiner

*Primary Examiner*—Truc Nguyen
(74) *Attorney, Agent, or Firm*—Romi N. Bose (57) ABSTRACT

An adapter is mountable to a bulkhead, panel, circuit box, circuit board or other substrate, and receives a fiber optic connector. The adapter can be swiveled or rotated relative to the bulkhead, panel, circuit box, circuit board or other substrate, thereby providing for enhanced cable management. The adapter may include a gasket that reduces electromagnetic interference (EMI).

16 Claims, 12 Drawing Sheets

SWIVEL ADAPTER

This application claims the benefit of U.S. provisional application Ser. No. 60/514,773 filed on Oct. 27, 2003.

FIELD OF THE INVENTION

The present invention relates generally to an adapter that is mounted to a bulkhead, panel, circuit box, circuit board or other substrate, and receives a fiber optic connector. More particularly, the adapter enables the received fiber optic connector to swivel relative to the bulkhead, panel, circuit box, circuit board or other substrate to enable cable management on the opposite sides of the substrate.

BACKGROUND OF THE INVENTION

U.S. Pat. No. 6,231,380 discloses a bulkhead connector system. The connector mounting-system includes an angled mounting plate having a generally planar back face including opposed mounting flanges for mounting to a bulkhead, and an angled front face positioned at an angle to the back face, and facing partially vertically downwardly when mounted to the bulkhead. The angled front face defines an opening for receipt of a first connector. A yoke is mounted to the angled mounting plate for holding the first connector within the opening. The first connector is connected to a second connector at the bulkhead. This allows for cable management.

The present invention is an improvement of the bulkhead connector system disclosed in U.S. Pat. No. 6,231,380. The present invention provides an adapter that is mountable to the bulkhead and can be swiveled or rotated relative to the bulkhead, thereby providing for enhanced cable management because the adapter of the present invention can be moved to multiple positions. Other features and advantages of the present invention will be apparent upon a reading of the attached specification in combination with a study of the drawings.

OBJECTS AND SUMMARY OF THE INVENTION

A general object of the present invention is to provide an adapter that is mountable to a bulkhead, panel, circuit box, circuit board or other substrate, and receives a fiber optic connector.

Another general object of the present invention is to provide an adapter that can be swiveled or rotated relative to the bulkhead, panel, circuit box, circuit board or other substrate, thereby providing for cable management.

A object of the present invention is to provide an adapter that reduces electromagnetic interference (EMI).

Briefly, and in accordance with the foregoing, the present invention discloses an adapter that is mountable to a bulkhead, panel, circuit box, circuit board or other substrate, and receives a fiber optic connector. The adapter can be swiveled or rotated relative to the bulkhead, panel, circuit box, circuit board or other substrate, thereby providing for enhanced cable management. The adapter may include a gasket that reduces electromagnetic interference (EMI).

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.
}

While the terms top, bottom and the like are used in describing the components herein, it is to be understood that these terms are used for simplicity in describing the components, and are not limiting with regard to orientation of the components in use.

A universal swivel adapter 20, 220 is disclosed that is mounted to a bulkhead, panel, circuit box, circuit board or other substrate 21 behind an opening 23 therein. The swivel adapter 20, 220 includes an insert 38 that is either formed with, or includes, an adapter assembly 22. By simply replacing the existing insert 38 (and the adapter assembly 22) with an appropriate alternate insert and alternate adapter assembly, the swivel adapter 20, 220 is able to receive various types or styles of fiber optic connectors, such as an LC fiber optic connector 24, an SC fiber optic connector 26, and an MPO or MPO/MTP fiber optic connector 28, each of which are known in the art and therefore are not described herein. Therefore, advantageously, the swivel adapter 20, 220 itself does not have to be replaced or removed, making it a truly universal device.

Figure 1:
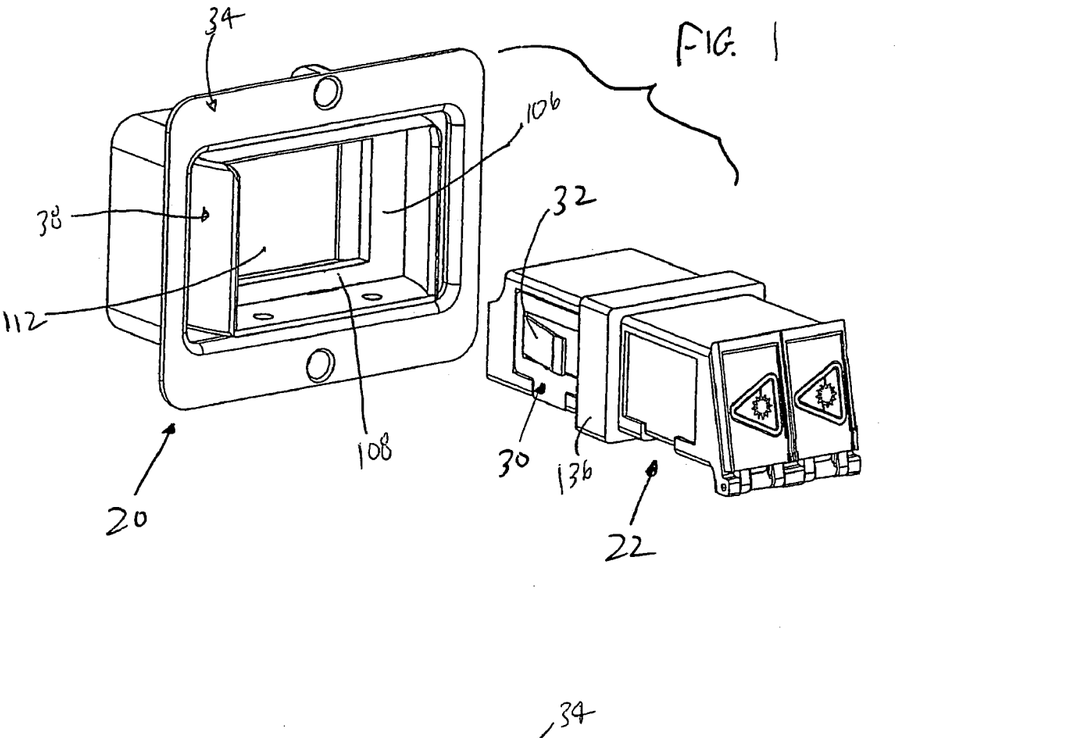
FIG. 1 is a perspective view of a swivel adapter that incorporates the features of the present invention in accordance with a first embodiment thereof, and a universal adapter exploded therefrom that can be used with the swivel adapter.
Figure 14:
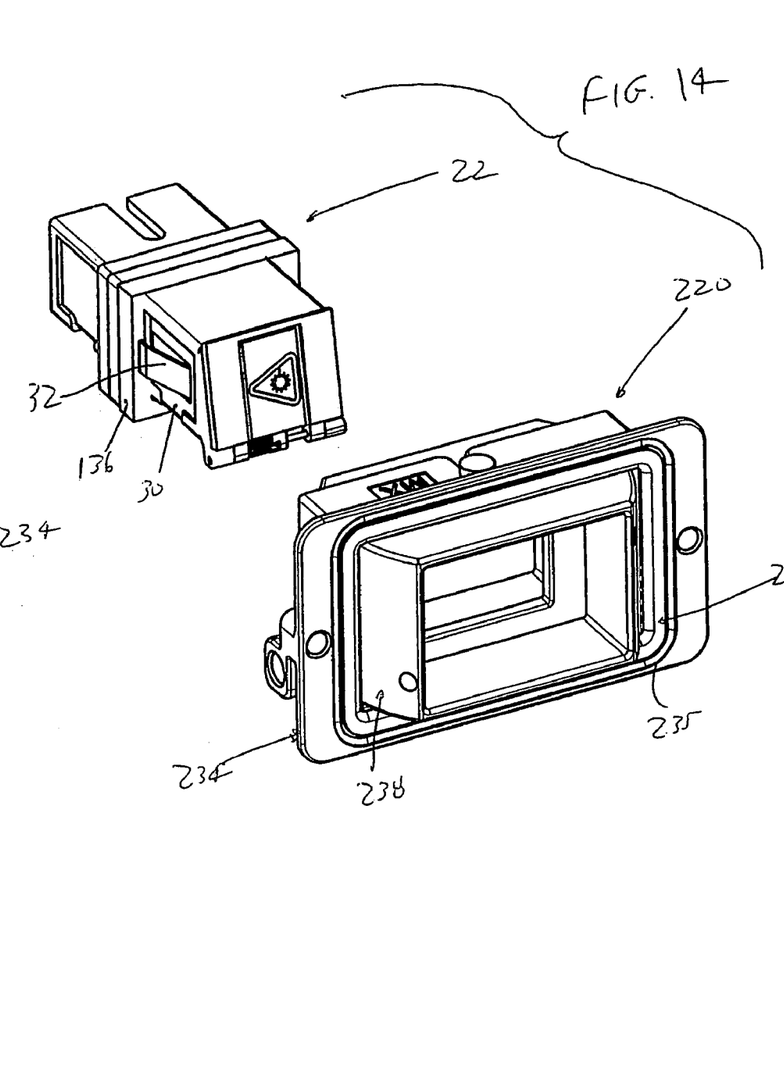
FIG. 14 is a perspective view of a swivel adapter that incorporates the features of the present invention in accordance with a second embodiment thereof, and an universal adapter exploded therefrom that can be used with the swivel adapter.

An MU fiber optic connector 29, shown only with the second embodiment, can also be attached to the adapter assembly 22 in either the first or second embodiments. As shown in FIGS. 1 and 14, a mounting plate 30 that has a pair of latch arms 32 (only one of which is shown) is attached to the adapter assembly 22. The mounting plate 30 attaches the adapter assembly 22 to the insert 38 of the swivel adapter 20, 220 as discussed herein. The adapter assembly 22 and mounting plate 30 are disclosed in U.S. Pat. No. 6,715,928 and U.S. patent application Ser. No. 10/935,768, which disclosures are herein incorporated by reference. The swivel adapter 20, 220 provides for the ability of the adapter assembly 22 and insert 38, and therefore the fiber optic connector 24, 26, 28 or 29 attached thereto, to swivel or rotate relative to the bulkhead, panel, circuit box, circuit board or other substrate 21. A first embodiment of the swivel adapter 20 is shown in FIGS. 1–13 and a second embodiment of the swivel adapter 220 is shown in FIGS. 14–27.

Attention is invited to the first embodiment of the universal swivel adapter 20 shown in FIGS. 1–13. As shown in the drawings, the swivel adapter 20 includes a housing 34, a gasket 36 for reducing electromagnetic interference (EMI) that is affixed to the housing 34, and an insert 38 that is mounted within the gasket 36. The housing 34 is affixed to the bulkhead, panel, circuit box, circuit board or other substrate 21 by suitable means. The insert 38 can be swiveled relative to the gasket 36 and the housing 34. When the adapter assembly 22 is inserted into the insert 38 of the swivel adapter 20, the adapter assembly 22 and insert 38 can be swiveled relative to the substrate 21 to which the housing 34 is mounted.

Figure 7:
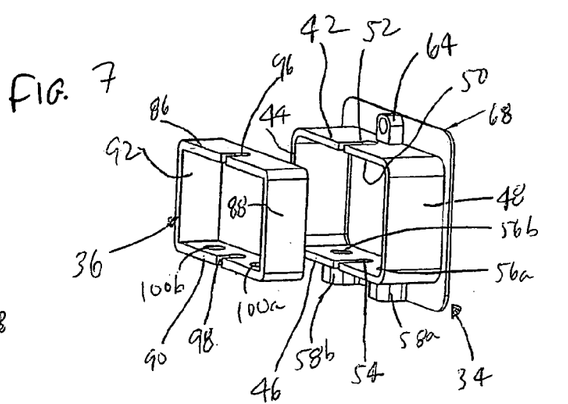
FIG. 7 is an exploded perspective view of a housing and a gasket of the swivel adapter of FIG. 1.
Figure 8:
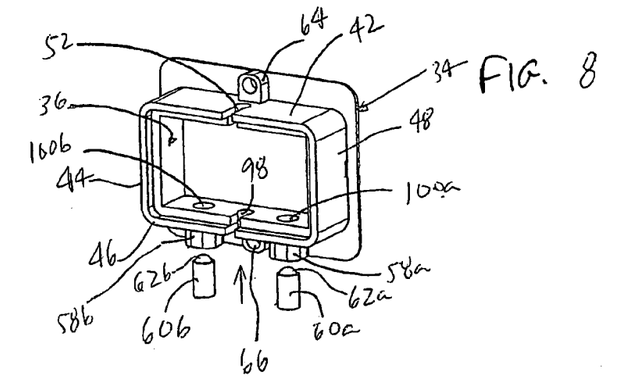
FIG. 8 is a perspective view of the housing and the gasket of the swivel adapter of FIG. 1.

As best illustrated in FIGS. 7 and 8, the housing 34 has a generally rectangular frame formed of a top wall 42, a left side wall 44, a bottom wall 46 and a right side wall 48. A cutout 50 is defined by the walls 42, 44, 46, 48. The walls 42, 44, 46, 48 are joined together by rounded corners. A central axis defined through the axial center of the walls 42, 44, 46, 48.

A top locking opening or channel 52 is provided at the midpoint of the top wall 42 and a bottom locking opening or channel 54 is provided at the midpoint of the bottom wall 46. Each locking channel 52, 54 is formed from an elongated straight slot that extends from a first end of the respective wall 42, 46 a predetermined distance and has an enlarged keyhole at the end thereof that is spaced from a second end of the walls 42, 46. The locking channels 52, 54 are aligned with each other.

A pair of apertures 56a, 56b are provided through the bottom wall 46 and are equidistantly spaced from the bottom locking channel 54. A pair of rounded sidewalls 58a, 58b extend downwardly from the bottom wall 46 and are aligned with the apertures 56a, 56b. The rounded sidewalls 58a, 58b have threaded passageways therethrough that communicate with the respective apertures 56a, 56b. A plunger 60a, 60b, FIG. 8, is received within each of the passageways of the rounded sidewalls 58a, 58b, such as by screwing the plungers 60a, 60b therethrough, and extends through the respective apertures 56a, 56b. The plungers 60a, 60b are formed from cylindrical tubes having springs therein. Each spring is loaded such that a nose or ball 62a, 62b provided at one end of the spring may be resiliently depressed when pressure is applied to its upper surface. The exterior surface of each plunger 60a, 60b is threaded for mating with the threaded passageways in the rounded sidewalls 58a, 58b. Alternate means known in the art can be provided for securing the plungers 60a, 60b within the rounded sidewalls 58a, 58b.

A top retaining rounded sidewall 64 extends upwardly from and perpendicular to the top wall 42, is positioned at the midpoint of the top wall 42, and proximate the second end of the top wall 42. An aperture is provided through the top retaining rounded sidewall 64. A bottom retaining rounded sidewall 66 extends downwardly from and perpendicular to the bottom wall 46, is positioned at the midpoint of the bottom wall 46, and is positioned proximate to the second end of the bottom wall 46. An aperture is provided through the bottom retaining rounded sidewall 66.

The frame further includes a flange 68 that extends perpendicularly from the second end of the walls 42, 44, 46, 48 and outwardly from the cutout 50. The flange 68 is formed of an upper portion 70 that extends from the top wall 42, a left side portion 72 that extends from the left side wall 44, a lower portion 74 that extends from the bottom wall 46, and a right side portion 76 that extends from the right side wall 48.

A top aperture 78 is provided through the midpoint of the upper portion 70 of the flange 68 and is aligned with the aperture provided through the top retaining rounded sidewall 64. A bottom aperture 80 is provided through the lower portion 74 of the flange 68 and is aligned with the aperture provided through the bottom retaining rounded sidewall 66. A top retainer 82 is engaged through the top aperture 78 and top retaining rounded sidewall 64 and a bottom retainer 84 is engaged through the bottom aperture 80 and the bottom retaining rounded sidewall 66 for receiving screws or other retaining devices for installation into the bulkhead, panel, circuit box, circuit board or other substrate 21. The flange 68 abuts against the bulkhead, panel, circuit box, circuit board or other substrate 21 proximate the opening 23 when the swivel adapter 20 is installed in the final assembly.

The gasket 36, best illustrated in FIG. 8, that may be made from EMI shielding materials as known in the art, is provided for reducing EMI. Typically, such shielding materials are conductive. The gasket 36 is formed of a generally rectangular frame having a top wall 86, a left side wall 88, a bottom wall 90 and a right side wall 92. A cutout 94 is formed within the walls 86, 88, 90, 92. The walls 86, 88, 90, 92 are joined together by rounded corners. The gasket 36 fits within the cutout 50 of the housing 34 and is affixed thereto, for example by adhesive. A top locking channel 96 is provided at the midpoint of the top wall 86 and a bottom locking channel 98 is provided at the midpoint of the bottom wall 92. Each locking channel 96, 98 is formed from an elongated slot that extends from a first end of the respective wall 86, 92 a predetermined distance and has an enlarged keyhole at the end thereof that is spaced from a second end of the walls 86, 92. The locking channels 96, 98 are aligned with each other. A pair of apertures 100a, 100b is provided through the bottom wall 90 and are equidistantly spaced from the bottom locking channel 98. When the gasket 36 is inserted into the housing 34, the top locking channels 52, 96 align, the bottom locking channels 54, 98 align and the apertures 56a, 100a; 56b, 100b align.

Figure 9:
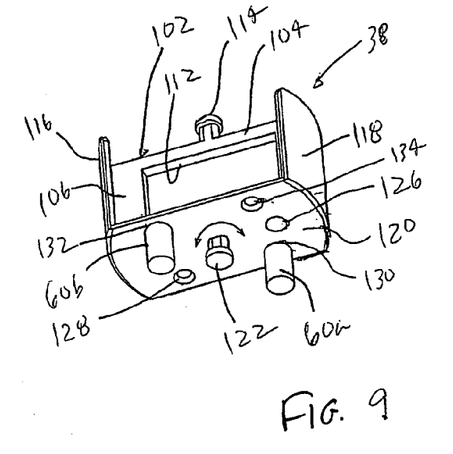
FIG. 9 is a perspective view of an insert of the swivel adapter of FIG. 1.
Figure 10:
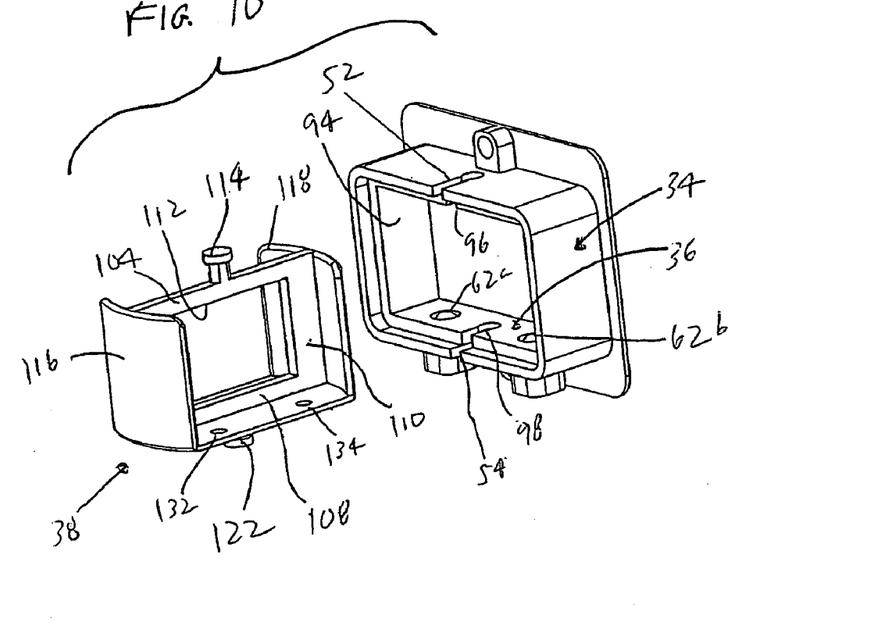
FIGS. 10 and 11 are perspective views of the insert and housing/gasket showing the orientation of the insert for insertion into the housing/gasket.
Figure 11:
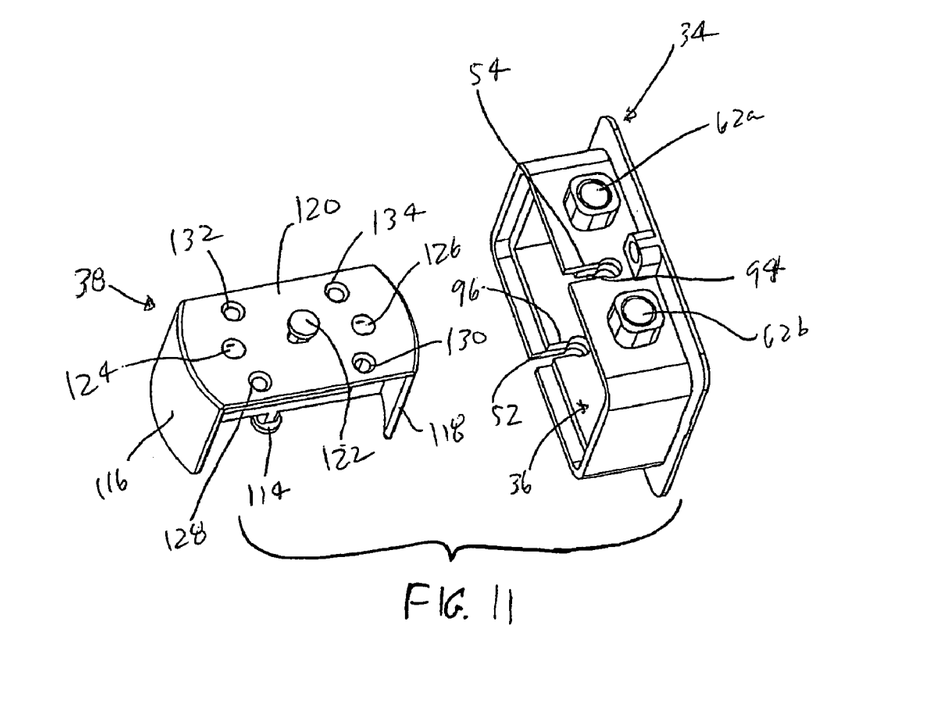

The insert 38, best illustrated in FIGS. 9–11, is formed of a generally rectangular frame having a top wall 104, a left side wall 106, a bottom wall 108 and a left side wall 110. A cutout 112 is formed within the walls 104, 106, 108, 110. A rounded sidewall 114 extends upwardly from the midpoint of the top wall 104. The rounded sidewall 114 is formed from a necked down portion that has an enlarged head at its free end. The necked down portion is flat and narrow, and the longer edge thereof is parallel to the walls 104, 106, 108, 110.

A left side arcuate wall 116 is attached to the left side wall 106. The midpoint of the arcuate wall 116 is attached to the end of the left side wall 106 and the ends of the arcuate wall 116 extend toward a center of the cutout 112. A right side arcuate wall 118 is attached to the right side wall 110. The midpoint of the arcuate wall 118 is attached to the end of the right side wall 110 and the ends of the arcuate wall 118 extend toward a center of the cutout 112. The outer surfaces of the arcuate walls 116, 118 are smooth.

A lower wall 120 extends perpendicularly from the bottom wall 108 and spans the distance between the arcuate walls 116, 118. The lower wall 120 bisects the bottom wall 108 at the midpoint thereof. As best shown in FIG. 11, a rounded sidewall 122 extends downwardly from the center of the lower wall 120. The rounded sidewall 122 is formed from a necked down portion that has an enlarged head at its free end. The necked down portion is flat and narrow, and the longer edge thereof is parallel to the walls 104, 106, 108, 110. On either side of the rounded sidewall 122, a recess 124, 126 is provided at a predetermined radial distance from the rounded sidewall 122, and at the midpoint of the respective arcuate arm 116, 118. The recesses 124, 126 are equidistantly spaced from the rounded sidewall 122. Recesses 128, 132 are provided on opposite sides of recess 124 and are spaced predetermined distances therefrom. The recesses 128, 132 are provided along the same radial line from the rounded sidewall 122 as the recess 124. Recesses 130, 134 are provided on opposite sides of recess 126 and are spaced predetermined distances therefrom. The recesses 130, 134 are provided along the same radial line from the rounded sidewall 122 as the recess 126. Recesses 128 and 130 are spaced from the second end of the insert 38 the same distance and recesses 132 and 134 are spaced from the first end of the insert 38 the same distance. Recesses 128 and 134 form a first set, recesses 124, 126 form a second set, and recesses 132 and 130 form a third set.

Figure 12:
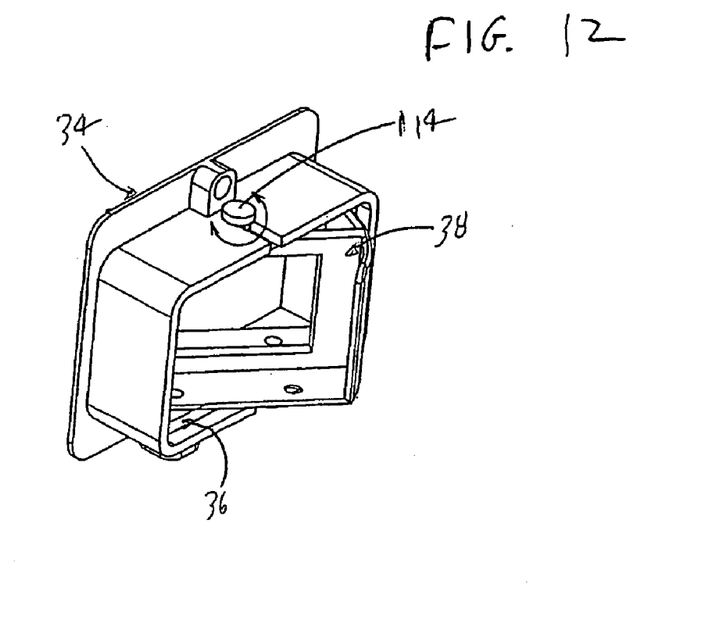
FIG. 12 is a perspective view of the swivel adapter of FIG. 1 in an intermediate stage of assembly.
Figure 13:
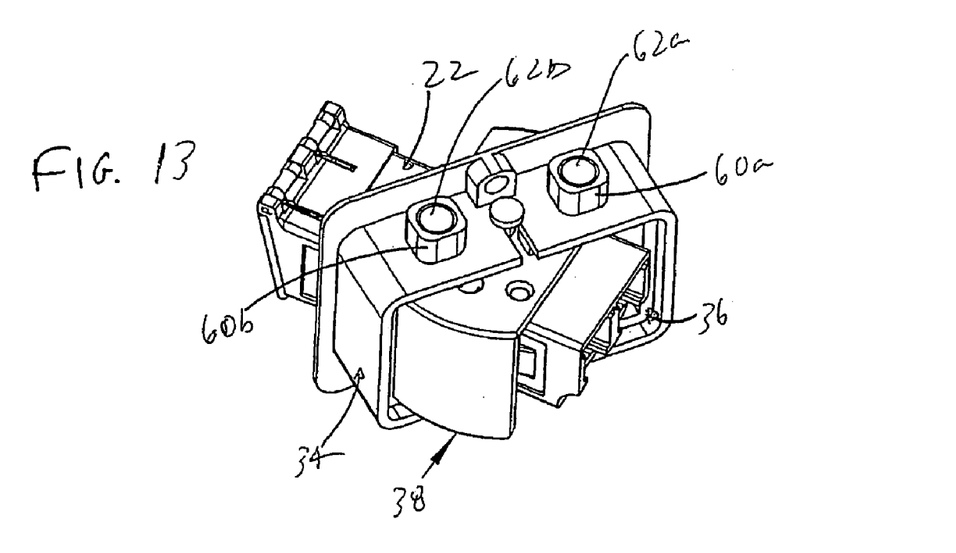
FIG. 13 is a perspective view of the universal adapter coupled with the swivel adapter of FIG. 1.

As illustrated in FIGS. 10 and 11, the insert 38 is seated within the cutout 94 of the gasket 36 by inserting the necked down portion of the top rounded sidewall 114 into the top locking channels 52, 96 and by inserting the necked down portion of the bottom rounded sidewall 122 into the bottom locking channels 54, 94. The lower wall 120 is parallel to the bottom wall 90 of the gasket 36. The flats of the rounded sidewalls 114, 116 slide along the elongated slots until the necked down portions rest in the enlarged keyholes of the locking channels 52, 96; 54, 94. Next, as shown in FIG. 12, the insert 38 is rotated to its normal operating position that results in the misalignment of the flats of the necked down portions with the elongated slots and causes the rounded sidewalls 114, 116 to be retained in the keyhole portions of the locking channels 52, 96; 54, 94.

Once the insert 38 is moved into the operating position, the insert 38 can be rotated or swiveled relative the gasket 36 and the housing 34. The insert 38 swivels or rotates relative to the plane that is perpendicular to the central axis of the housing 34. The insert 38 is sized such that the arcuate arms 116, 118 are in constant contact with the gasket 36 as the insert 38 is being rotated within the gasket 36. The arcuate arms 116, 118 slide along the inner surfaces of the left and right walls 88, 92 of the gasket 36. The constant contact between the gasket 36 and the insert 38 provides for enhanced EMI reduction. The insert 38 may be manufactured of metal for increased EMI reduction. For complete EMI protection, the swivel adapter 20 and all its components can be made of metal.

When the insert 38 is positioned such that the frame of the insert 38 is parallel with the flange 68 of the housing 34, the nose or ball 62a, 62b of each plunger 60a, 60b is seated within the respective recess 126, 124 to prevent the insert 38 from moving. The tubes in which the noses or balls 62a, 62b are provided do not enter into the recesses 126, 124. Upon rotation of the insert 38 by a user out of this position, the noses or balls 62a, 62b are depressed into the tubes and either roll along or slide along the lower surface of the lower wall 120 of the insert 38. Once the respective nose or ball 62a, 62b enters into one of the sets of recesses 128, 134 or 132, 130, the springs expand and the noses or balls 62a, 62b seat within the respective set of recesses 128, 134 or 132, 130 to lock the insert 38 into place. When the insert 38 is moved such that the noses or balls 62a, 62b enter into one of the sets of recesses 128, 134 or 132, 130, the frame of the insert 38 is angled relative to the flange 68 of the housing 34. The insert 38 can be moved to one of the three positions and locked into place, but can also be easily moved to any of the other positions by a user. Although three locking positions are illustrated, it is to be understood that one or more or more locking positions can be provided by the removal or addition of further recesses. As a result, the insert 38 can be angled relative to the plane of the bulkhead, panel, circuit box, circuit board or other substrate 21 to which the housing 34 is mounted.

Figure 2:
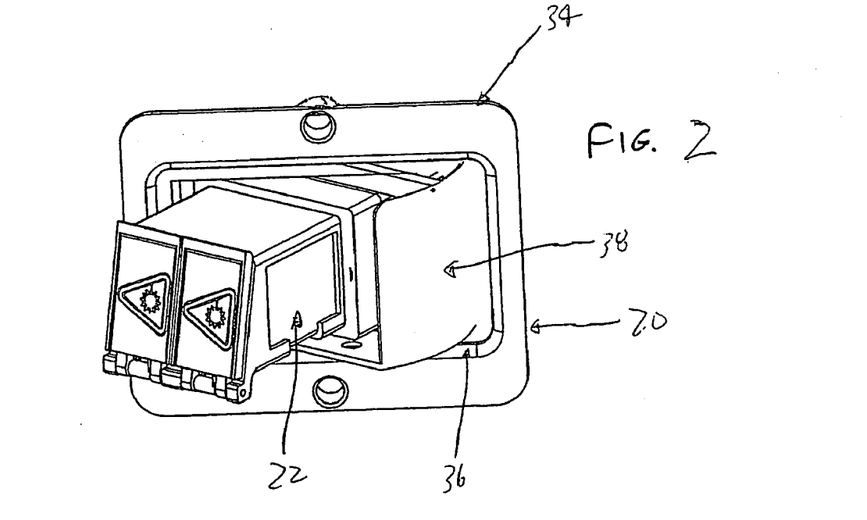
FIG. 2 is a perspective view of the universal adapter coupled with the swivel adapter of FIG. 1.
Figure 3:
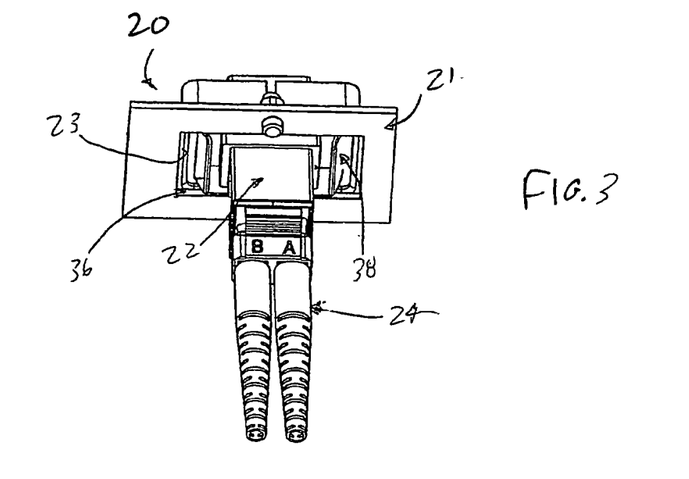
FIGS. 3–5 are perspective views of the universal adapter coupled with the swivel adapter of FIG. 1, with a fiber optic connector further coupled to the universal adapter.
Figure 4:
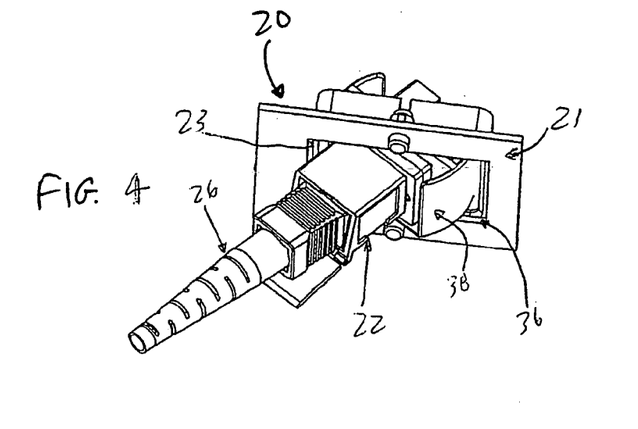
Figure 5:
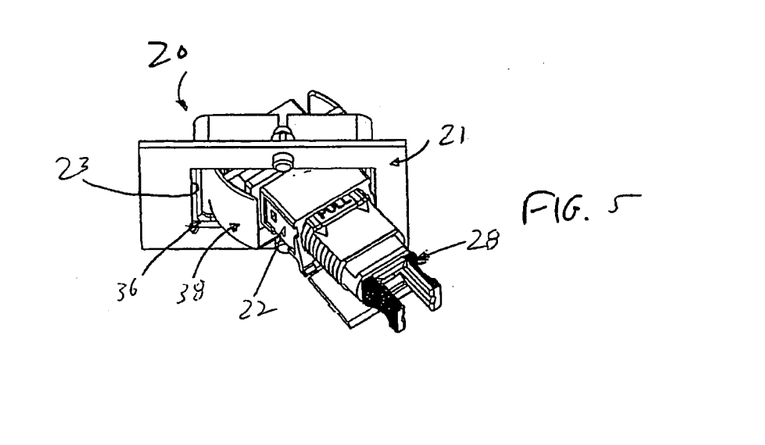
Figure 6:
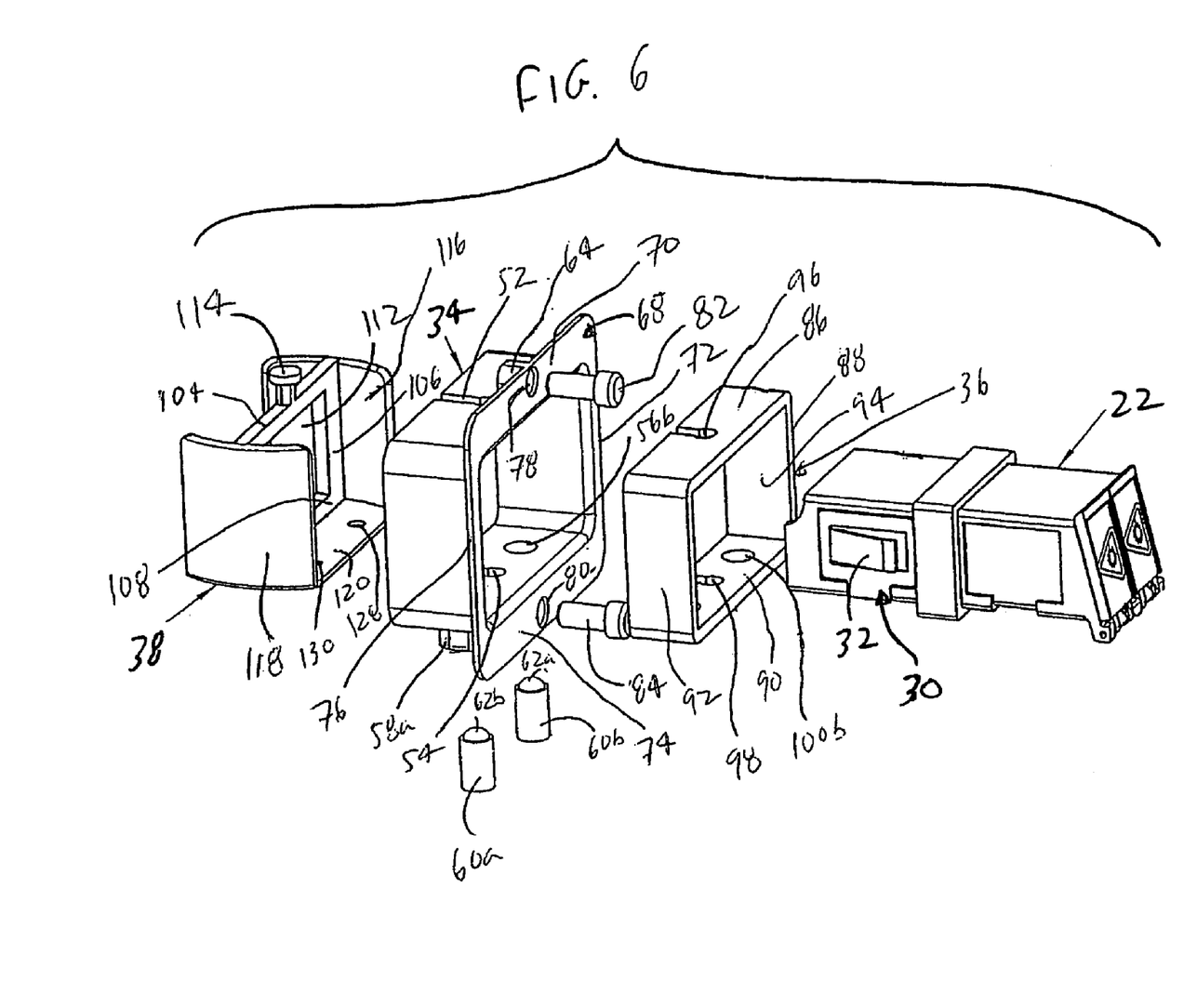
FIG. 6 is an exploded perspective view of the components of the swivel adapter of FIG. 1 and a perspective view of universal adapter.

FIGS. 1 and 2 show the adapter assembly 22 and insert 38 being mounted to the swivel adapter 20. The latch arms 32 extend outwardly from the body of the adapter assembly 22 at an angle such that the adapter assembly 22 is easily inserted into the cutout 112 of the insert 38. Upon insertion of the adapter assembly 22 into the cutout 112, the latch arms 32 are depressed against the body of the adapter assembly 22. Once the latch arms 32 clear the frame surrounding the cutout 112, the latch arms 32 spring outwardly and engage the frame. A flange 136, which is larger than the cutout 112, is provided on the body of the adapter assembly 22, and provides a stop for the adapter assembly 22 once placed into the insert 38. The combination of the flange 136 and the mounting plate 30 hold the adapter assembly 22 securely in place within the insert 38. The cutout 112 provided in the insert 38 enables the fiber optic connector 24, 26, 28 mounted in the adapter assembly 22 to optically connect to a cable (not shown) on the other side of the adapter 20 at any one of the desired positions, thereby providing for cable management.

It is to be understood that the adapter assembly 22 can be eliminated and the specific fiber optic can be directly mounted to the swivel adapter 20 by suitable means.

Attention is invited to the second embodiment of the swivel adapter 220 shown in FIGS. 14–27. As shown in the drawings, the swivel adapter 220 includes a housing 234, a flexible gasket 235 attached to the housing 234, a gasket (or group of gaskets) 236 for reducing EMI, which is affixed to the housing 234, and an insert 238 that is mounted within the gasket 236. The housing 234 is affixed to the bulkhead, panel, circuit box, circuit board or other substrate 21 by suitable means. The insert 238 can be swiveled relative to the gasket 236 and the housing 234. When the adapter assembly 22 is inserted into the swivel adapter 220, the adapter assembly 22 is inserted into the insert 238. As a result, the adapter assembly 22 can be swiveled relative to the substrate 21 to which the housing 234 is mounted.

Figure 21:
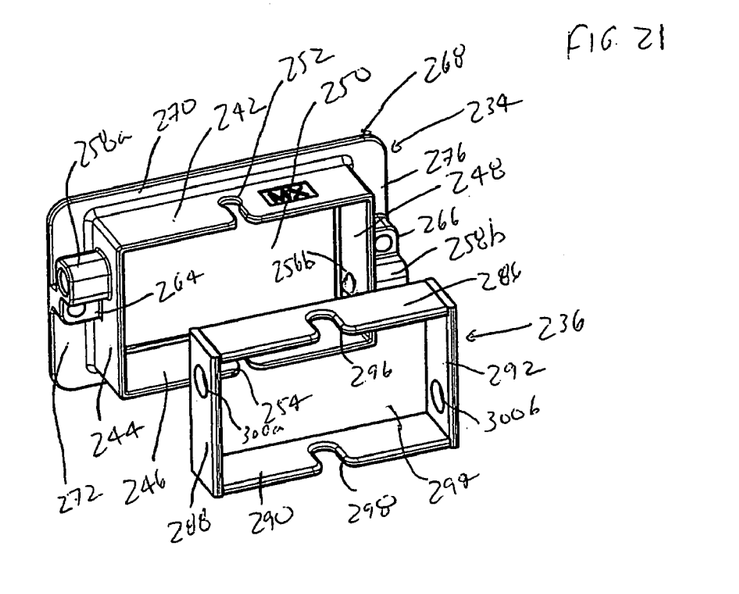
FIG. 21 is an exploded perspective view of a housing and a gasket of the swivel adapter of FIG. 14.
Figure 22:
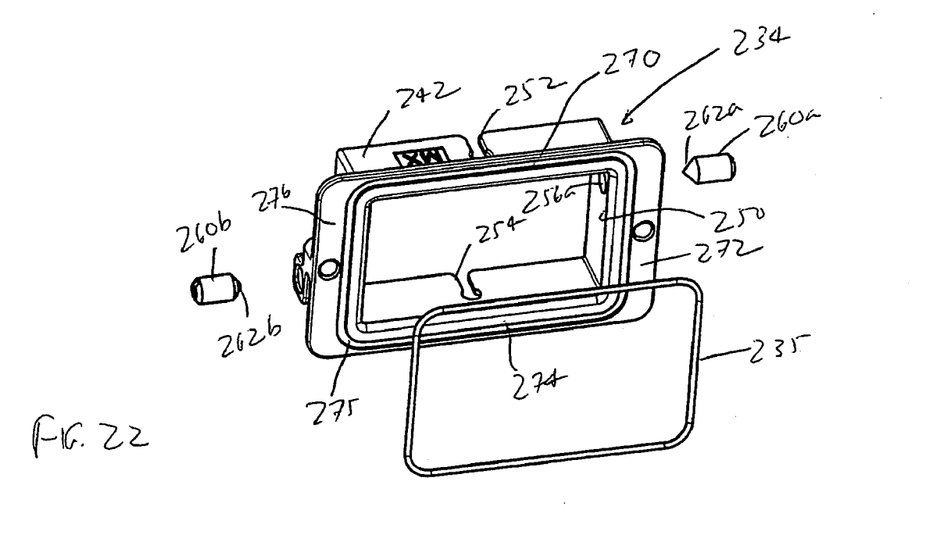
FIG. 22 is an exploded perspective view of the housing of FIG. 21 and a gasket of the swivel adapter of FIG. 14.
Figure 23:
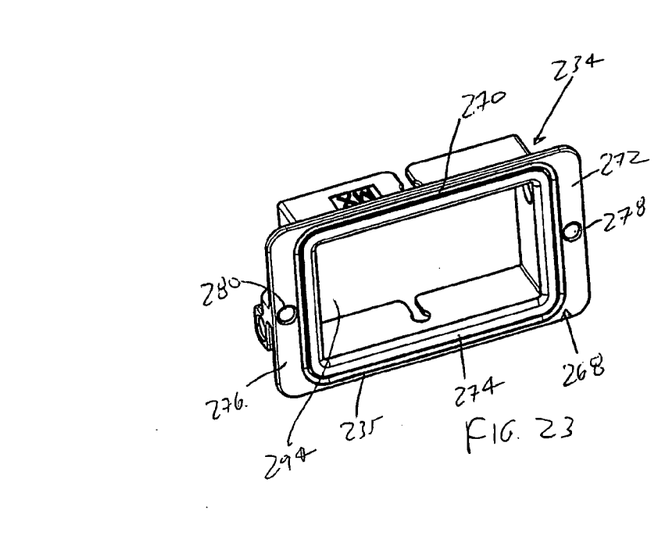
FIG. 23 is an assembled perspective view of the housing and gasket shown in FIG. 21.

As best illustrated in FIGS. 21–23, the housing 234 has a generally rectangular frame formed of a top wall 242, a left side wall 244, a bottom wall 246 and a right side wall 248. A cutout 250 is defined by the walls 242, 244, 246, 248. A central axis defined through the axial center of the walls 242, 244, 246, 248.

A top locking opening or channel 252 is provided at the midpoint of the top wall 242 and a bottom locking opening or channel 254 is provided at the midpoint of the bottom wall 246. Each locking channel 252, 254 is formed from an elongated straight slot that extends from a first end of the respective wall 242, 246 a predetermined distance and has an enlarged keyhole at the end thereof that is spaced from a second end of the walls 242, 246. The locking channels 252, 254 are aligned with each other.

An aperture 256a is provided through left side wall 244 proximate to, but spaced from, the top wall 242. An aperture 256b is provided through right side wall 248 proximate to, but spaced from, the bottom wall 246. A rounded sidewall 258a extends outwardly from the left side wall 244 and is aligned with the aperture 256a. A second rounded sidewall 258b extends outwardly from the right side wall 248 and is aligned with the aperture 256b. The rounded sidewalls 258a, 258b have threaded passageways therethrough that communicate with the respective apertures 256a, 256b. A threaded set screw 260a, 260b or other fastener such as a spring loaded ball plunger, FIG. 22, is received within each of the passageways of the rounded sidewalls 258a, 258b, by screwing the set screws 260a, 260b therethrough, and extends through the respective apertures 256a, 256b. The set screws 260a, 260b have a pointed nose 262a, 262b provided at one end thereof. Alternate means known in the art can be provided for securing the set screws 260a, 260b within the rounded sidewalls 258a, 258b, provided the set screws 260a, 260b can be moved relative to the rounded sidewalls 258a, 258b. It should be noted that set screws and other fasteners also may be used in a similar manner in the first embodiment described above.

A left side retaining rounded sidewall 264 extends outwardly from and perpendicular to the left side wall 244, is positioned at the midpoint of the left side wall 244, and is positioned proximate to the second end of the left side wall 244. An aperture is provided through the left side retaining rounded sidewall 264. A right side retaining rounded sidewall 266 extends outwardly from and perpendicular to the right side wall 248 and is positioned at the midpoint of the right side wall 248, and is positioned proximate to the second end of the right side wall 248. An aperture is provided through the right side retaining rounded sidewall 266.

The frame further includes a flange 268, best illustrated in FIG. 22, which extends perpendicularly from the second end of the walls 242, 244, 246, 248 and outwardly from the cutout 250. The flange 268 is formed of an upper portion 270 that extends from the top wall 242, a left side portion 272 that extends from the left side wall 244, a lower portion 274 that extends from the bottom wall 246, and a right side portion 276 that extends from the right side wall 248. The gasket 235 is seated within a groove 275 that surrounds the cutout 250.

A left side aperture 278 is provided through the midpoint of the left side portion 270 of the flange 268 and is aligned with the aperture provided through the left side retaining rounded sidewall 264. The left side aperture 278 is proximate to the groove 275. A right side aperture 280 is provided through the right side portion 274 of the flange 268 and is aligned with the aperture provided through the right side retaining rounded sidewall 266. The right side aperture 280 is proximate to the groove 275. A retainer (not shown) is engaged through the left side aperture 278 and left side retaining rounded sidewall 264 and a retainer (not shown) is engaged through the right side aperture 280 and the right side retaining rounded sidewall 266 for receiving screws or other retaining devices for installation into the bulkhead, panel, circuit box, circuit board or other substrate 21. The flange 268 abuts against the bulkhead, panel, circuit box, circuit board or other substrate 21 proximate the opening 23 when the swivel adapter 220 is installed in the final assembly.

The gasket 236, best illustrated in FIG. 21, which may be made from EMI shielding materials as known in the art, is provided for reducing EMI. The gasket 236 is formed of a generally rectangular frame having a top wall 286, a left side wall 288, a bottom wall 290 and a right side wall 292. A cutout 294 is formed within the walls 286, 288, 290, 292. The gasket 236 fits within the cutout 250 of the housing 234 and is affixed thereto, for example by adhesive. A top locking channel 296 is provided at the midpoint of the top wall 286 and a bottom locking channel 298 is provided at the midpoint of the bottom wall 292. Each locking channel 296, 298 is formed from an elongated slot that extends from a first end of the respective wall 286, 292 a predetermined distance and has a rounded end that is spaced from a second end of the walls 286, 292. The locking channels 296, 298 are aligned with each other. An aperture 300a is provided through left side wall 288 proximate to, but spaced from, the top wall 286. An aperture 300b is provided through right side wall 292 proximate to, but spaced from, the bottom wall 290. When the gasket 236 is inserted into the housing 234, the top locking channels 252, 296 align, the bottom locking channels 254, 298 align and the apertures 256a, 300a; 256b, 300b align.

Figure 24:
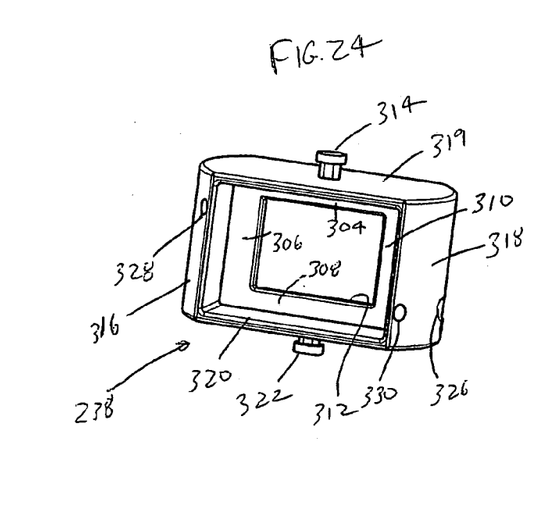
FIGS. 24 and 25 are perspective views of an insert of the swivel adapter of FIG. 14.
Figure 25:
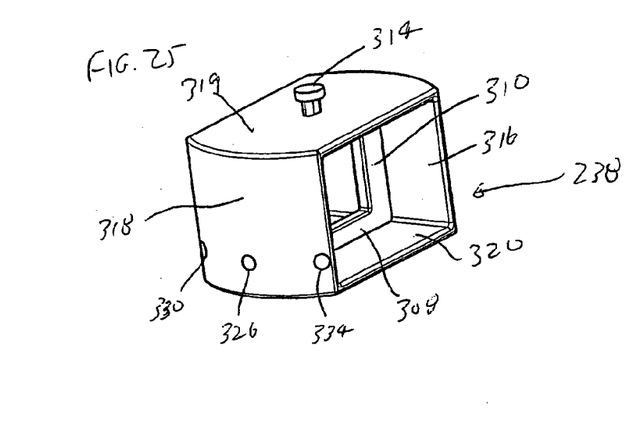

The insert 238, best illustrated in FIGS. 24 and 25, is formed of a generally rectangular frame having a top wall 304, a left side wall 306, a bottom wall 308 and a right side wall 310. A cutout 312 is formed within the walls 304, 306, 308, 310.

A left side wall 316 that has an arcuate outer surface is attached to the left side wall 306. The midpoint of the left side wall 316 is attached to the end of the left side wall 306. A right side wall 318 that has an arcuate outer surface is attached to the right side wall 310. The midpoint of the arcuate wall 318 is attached to the end of the right side wall 310. The arcuate outer surfaces are smooth.

An upper wall 319 extends perpendicularly from the top wall 304 and spans the distance between the walls 316, 318. The upper wall 319 bisects the top wall 308 at the midpoint thereof. A rounded sidewall 314 extends upwardly from the center of the upper wall 319. The rounded sidewall 314 is formed from a necked down portion that has an enlarged head at its free end. The necked down portion is flat and narrow, and the longer edge thereof is parallel to the walls 304, 306, 308, 310.

A lower wall 320 extends perpendicularly from the bottom wall 308 and spans the distance between the arcuate walls 316, 318. The lower wall 320 bisects the bottom wall 308 at the midpoint thereof. A rounded sidewall 322, FIG. 24, extends downwardly from the center of the lower wall 320. The rounded sidewall 322 is formed from a necked down portion that has an enlarged head at its free end. The necked down portion is flat and narrow, and the longer edge thereof is parallel to the walls 304, 306, 308, 310.

Three spaced apart left side recesses 324, 328, 332 are provided in the arcuate outer surface of the left side wall 316 proximate to the top wall 319. The recesses 324, 328, 332 are spaced equidistantly from the top wall 319. Three spaced apart recesses 330, 326, 334 are provided in the arcuate outer surface proximate of the right side wall 318 proximate to the lower wall 320. The recesses 324, 328, 332 are spaced equidistantly from the lower wall 320. Recesses 328 and 334 form a first set, recesses 324, 326 form a second set, and recesses 332 and 330 form a third set.

Figures 26, 27:
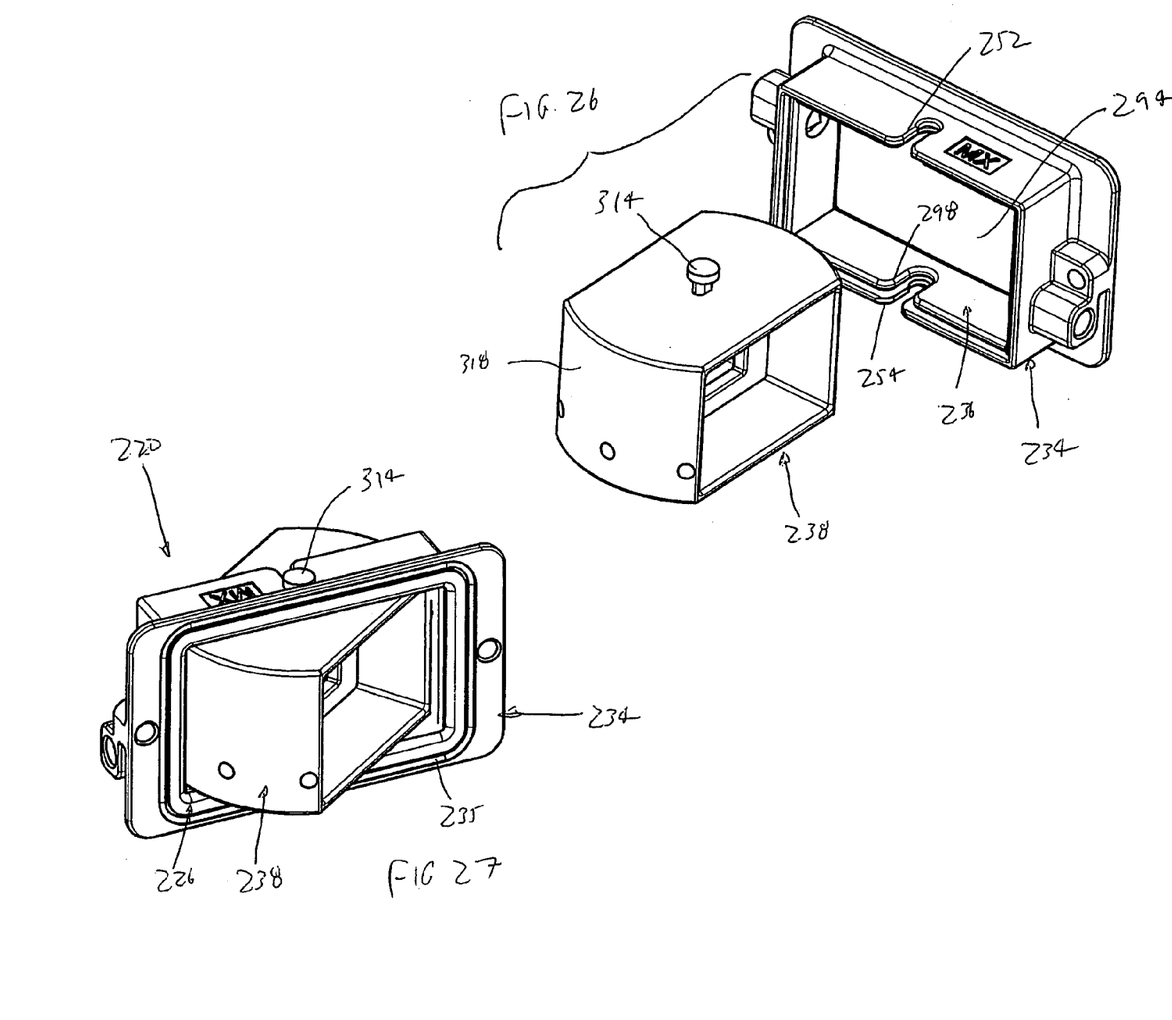
FIG. 26 is a perspective view of the insert and housing/gasket showing the orientation of the insert for insertion into the housing/gasket.
FIG. 27 is a perspective view of the swivel adapter of FIG. 14 in an assembled condition.

As shown in FIG. 26, the insert 238 is seated within the cutout 294 of the gasket 236 by inserting the necked down portion of the top rounded sidewall 314 into the top locking channels 252, 296 and by inserting the necked down portion of the bottom rounded sidewall 322 into the bottom locking channels 254, 294. The upper wall 319 is parallel to the top wall 286 of the gasket 236. The lower wall 320 is parallel to the bottom wall 290 of the gasket 236. The flats of the rounded sidewalls 314, 316 slide along the elongated slots until the necked down portions rest in the enlarged keyholes of the locking channels 252, 254. Next, the insert 238 is rotated to its normal operating position that results in the misalignment of the flats of the necked down portions with the elongated slots and causes the rounded sidewalls 314, 316 to be retained in the keyhole portions of the locking channels 252, 254.

Once the insert 238 is moved into the operating position, the insert 238 can be rotated or swiveled relative the gasket 236 and the housing 234. The insert 238 swivels or rotates relative to the plane that is perpendicular to the central axis of the housing 234. The insert 238 is sized such that the arcuate arms 316, 318 are in constant contact with the gasket 236 as the insert 238 is being rotated within the gasket 236. The arcuate arms 316, 318 slide along the inner surfaces of the left and right walls 288, 292 of the gasket 236. The constant contact between the gasket 236 and the insert 238 provides for enhanced EMI reduction. The insert 238 may be manufactured of metal for increased EMI reduction. For complete EMI protection, the swivel adapter 220 and all its components can be made of metal.

When the insert 238 is positioned such that the frame of the insert 238 is parallel with the flange 268 of the housing 234, the nose 262a, 262b of each set screw 260a, 260b is seated within the respective recess 326, 324 to prevent the insert 238 from moving. The set screws 260a, 260b or ball plungers 260a, 260b can be unscrewed such that the nose 262a, 262b does not enter into the recesses 326, 324 and thereafter, the insert 238 can be rotated to another position and the set screws 260a, 260b re-engaged with one of the other sets of recesses (first set 328, 334 or third set 332 and 330). When the insert 238 is moved such that the noses 262a, 262b enter into one of the sets of apertures 328, 334 or 332, 330, the frame of the insert 238 is angled relative to the flange 268 of the housing 234. The insert 238 can be moved to one of the three positions and locked into place, but can also be easily moved to any of the other positions by a user. While three locking positions are shown, it is to be understood that one or more locking positions can be provided by the removal or addition of further apertures and/or recesses. As a result, the insert 238 can be angled relative to the plane of the bulkhead, panel, circuit box, circuit board or other substrate 21 to which the housing 234 is mounted. It should be noted that the set screws may be replaced by spring loaded ball plungers or other fasteners.

Figure 15:
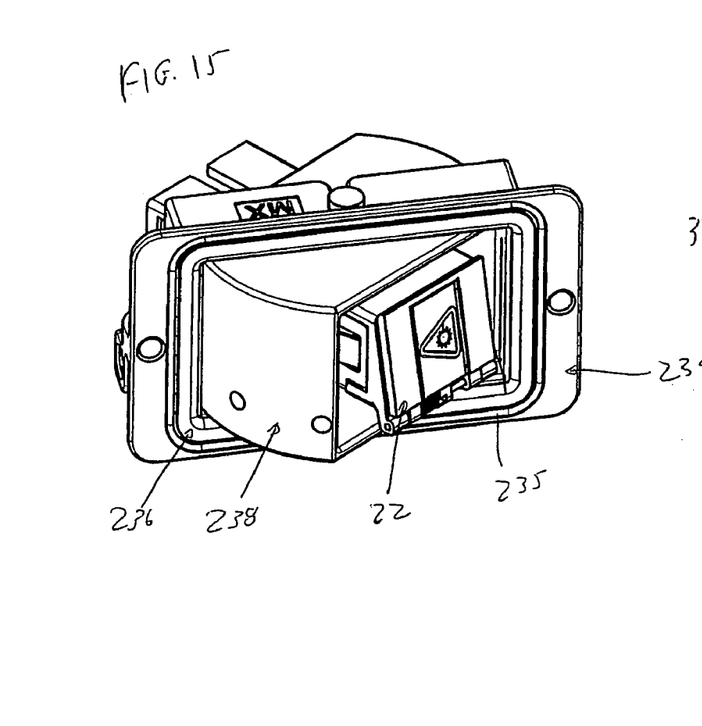
FIG. 15 is a perspective view of the universal adapter coupled with the swivel adapter of FIG. 14.
Figure 16:
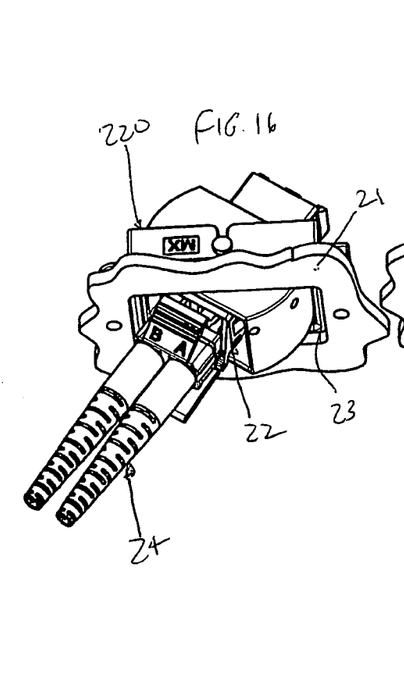
FIGS. 16–19 are perspective views of the universal adapter coupled with the swivel adapter of FIG. 14, with a fiber optic connector further coupled to the universal adapter.
Figure 17:
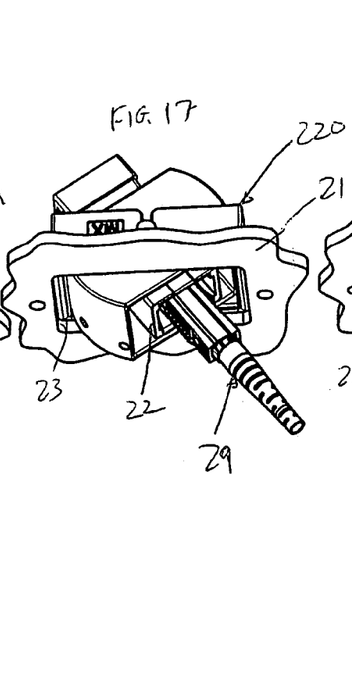
Figures 18, 19:
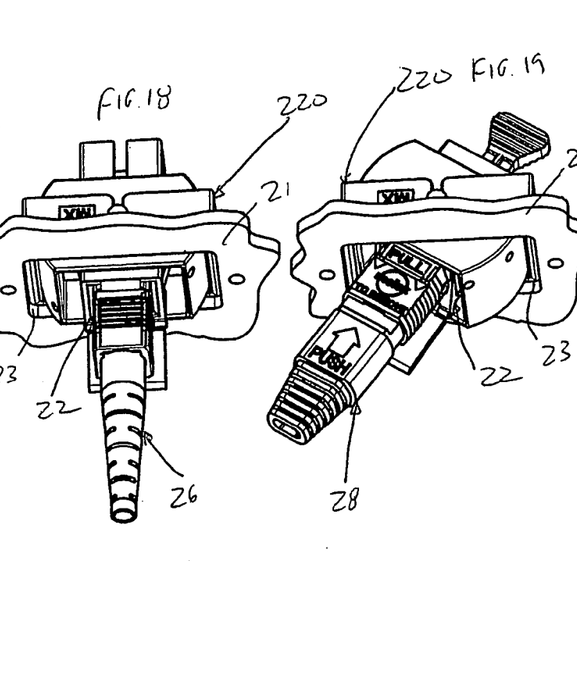
Figure 20:
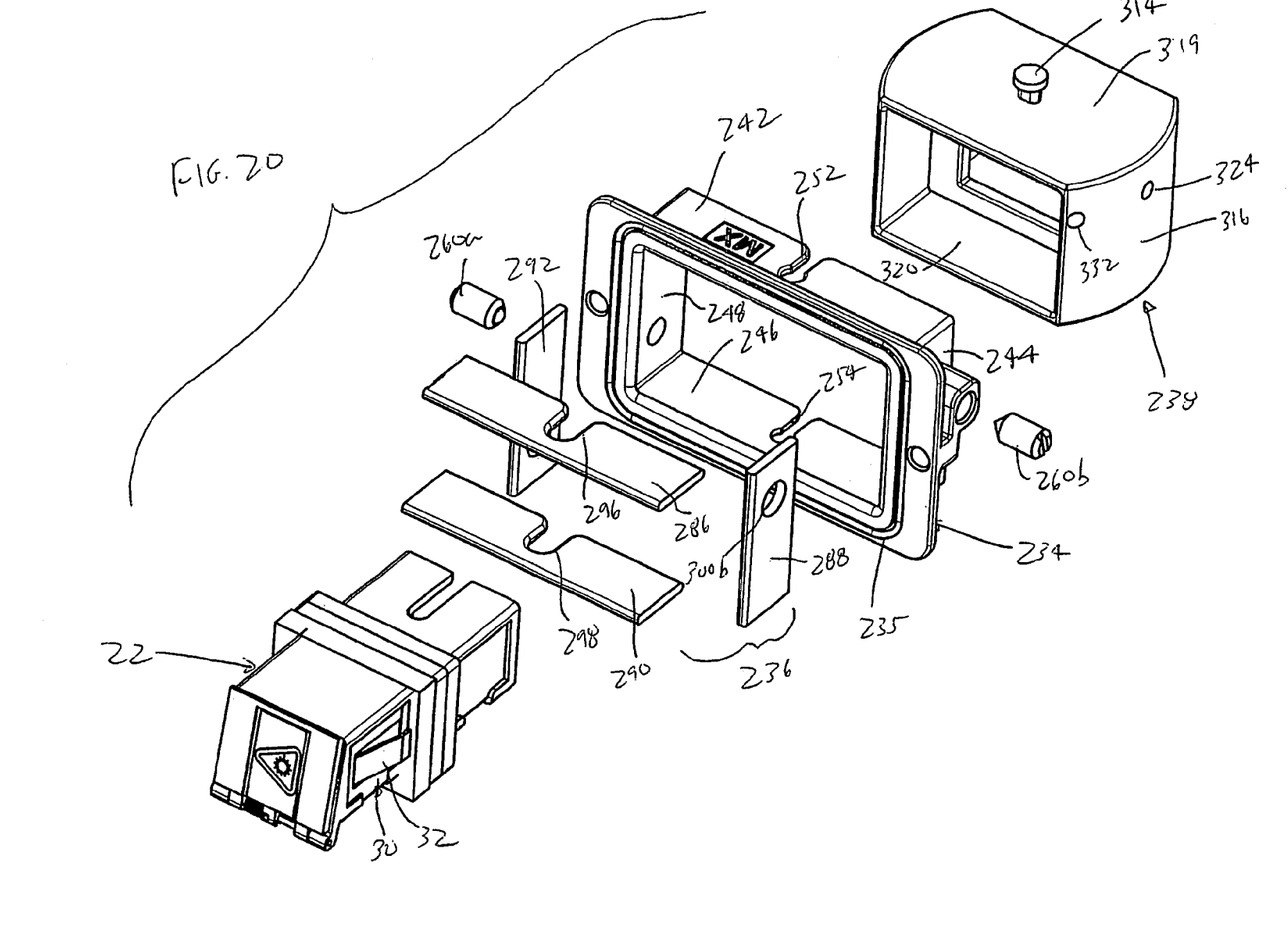
FIG. 20 is an exploded perspective view of the components of the swivel adapter of FIG. 14 and a perspective view of universal adapter.

FIGS. 14 and 15 show the adapter assembly 22 being mounted to the swivel adapter 220 via the insert 238. The latch arms 32 extend outwardly from the body of the adapter assembly 22 at an angle such that the adapter assembly 22 is easily inserted into the cutout 312 of the insert 238. Upon insertion of the adapter assembly 22 into the cutout 312, the latch arms 32 are depressed against the body of the adapter assembly 22. Once the latch arms 32 clear the frame surrounding the cutout 312, the latch arms 32 spring outwardly and engage the frame. A flange 136, which is larger than the cutout 312, is provided on the body of the adapter assembly 22, and provides a stop for the adapter assembly 22 once placed into the insert 238. The combination of the flange 136 and the mounting plate 30 hold the adapter assembly 22 securely in place within the insert 238. The cutout 312 provided in the insert 238 enables the fiber optic connector 24, 26, 28, 29, see FIGS. 16–19, mounted in the adapter assembly 22 to optically connect to a cable (not shown) on the other side of the swivel adapter 220 at any one of the three positions, thereby providing for cable management.

While locking channels 52, 54; 252, 254 are provided, it is to be understood that these are provided for ease in assembling the adapter 20, 200 and other means of coupling the insert 38, 138 and the housing 34, 134 can be provided.

It is to be understood that the adapter assembly 22 can be eliminated and the special fiber optic adapter 24 be directly mounted to the swivel adapter 220 by suitable means.

It is to be understood that the set screws 260a, 260b can be used in the first embodiment and plungers 60a, 60b can be used in the second embodiment. Also, other alternative means for releasably fixing the position of the insert 36, 236 relative to the housing 34, 234 can be provided and are within the scope of the present invention. For example, the insert 36, 236 can be formed having outwardly shaped bumps instead of the apertures and recesses; and the bumps on the insert, when the insert is rotated, engage apertures in the housing.

In another aspect of the invention, particularly in non-EMI sensitive applications, the EMI gasket 36, 236 may be eliminated.

While preferred embodiments of the present invention are shown and described, it is envisioned that those skilled in the art may devise various modifications of the present invention without departing from the spirit and scope of the appended claims.

The invention claimed is:

1. An adapter mountable to a substrate comprising:
a housing defining a central axis and a plane perpendicular to said central axis, wherein the housing includes a plurality of walls defining an opening;
an insert having at least one rounded sidewall for being mounted within said opening, said insert being rotatable relative to said plane such that said insert is capable of being parallel to or angled relative to said plane, said insert being configured to receive an adapter;

wherein said opening includes an elongated portion and a keyhole at an end thereof, said elongated portion having a predetermined width, said rounded sidewall having flat sides defining a width that is generally equal to said predetermined width of said elongated portion such that said rounded sidewall can slide within said elongated portion, said keyhole being sized to accommodate said rounded sidewall therein such that said rounded sidewall can rotate within said keyhole.

2. The adapter of claim 1, further including at least one plunger having a spring-biased ball therein, said at least one plunger being mounted to said housing, and said insert includes a plurality of recesses therein, wherein said ball is capable of being received within said recesses to lock the position of said insert relative to said housing.

3. The adapter of claim 1, further including at least one set screw mounted to said housing, said set screw being capable of being engaged against said insert to lock the position of said insert relative to said housing, and capable of being disengaged from said insert to enable a user to rotate said insert relative to said housing.

4. The adapter of claim 1, further including means associated with said housing for releasably locking said insert into place, said means being capable of being engaged against said insert to lock the position of said insert relative to said housing, and capable of being disengaged from said insert to enable a user to rotate said insert relative to said housing.

5. The adapter of claim 1, wherein said housing is formed of material that reduces electromagnetic interference.

6. The adapter of claim 1, further including a gasket attached to said housing.

7. The adapter of claim 1, further including a gasket mounted within said housing, said gasket comprising a plurality of walls that define an opening, said gasket being formed of a material that reduces electromagnetic interference, said insert being mounted within said opening in said gasket.

8. The adapter of claim 3, wherein said insert includes a plurality of recesses therein, said set screw being capable of being received within said recesses to lock the position of said insert relative to said housing.

9. The adapter of claim 8, wherein said insert includes a pair of arcuate walls, said recesses being provided within said arcuate walls.

10. The adapter of claim 4, wherein said insert includes a plurality of recesses therein, said means being capable of being received within said recesses.

11. The adapter of claim 10, wherein said insert includes a pair of arcuate walls, said arcuate walls, said recesses being provided in said arcuate walls.

12. The adapter of claim 5, wherein said insert is formed of material that reduces electromagnetic interference.

13. The adapter of claim 7, wherein said insert includes a pair of arcuate walls, said arcuate walls of said insert sliding against and constantly contacting at least two of said walls of said gasket when said insert is rotated relative to said housing.

14. The adapter of claim 7, wherein said housing includes an opening in one of said walls, said gasket includes an opening in one of said walls that aligns with said opening in said housing, and said insert includes a rounded sidewall, said rounded sidewall being received within said openings.

15. The adapter of claim 14, wherein said opening in said housing includes an elongated portion and a keyhole at an end thereof, said elongated portion having a predetermined width, said rounded sidewall having flat sides defining a width that is generally equal to said predetermined width of said elongated portion such that said rounded sidewall can slide within said elongated portion, said keyhole being sized to accommodate said rounded sidewall therein such that said rounded sidewall can rotate within said keyhole.

16. The adapter of claim 13, wherein said housing includes a first opening in one of said walls and a second opening in another of said walls, said gasket includes a first opening in one of said walls and a second opening in another of said walls, said first openings aligning and said second opening aligning, and said insert includes a pair of rounded sidewalls, respective ones of said rounded sidewalls being received in respective ones of said first and second openings.

* * * * *